United States Patent Office 3,660,430
Patented May 2, 1972

---

3,660,430
2-SUBSTITUTED-3-ARYLINDOLES
Meier E. Freed, Philadelphia, Stanley C. Bell, Montgomery, and Peter H. L. Wei, Delaware, Pa., assignors to American Home Products Corporation, New York, N.Y.
No Drawing. Filed Nov. 4, 1969, Ser. No. 874,047
Int. Cl. C07d 27/56
U.S. Cl. 260—326.16                                    4 Claims

ABSTRACT OF THE DISCLOSURE

The disclosure is directed to a method of preparation of 3-arylindoles containing certain electron withdrawing groups in the 2-position by alkylating a 2-aminobenzophenone and cyclizing the product to form an indole having the structure:

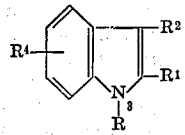
(I)

where $R^1$, $R^2$, $R^3$ and $R^4$ are as defined below. The disclosure is also directed to the intermediates and products of the process. The products are useful as central nervous system depressants in that they produce a calming effect in the host.

---

The invention is directed to a novel process for the synthesis of 3-arylindoles containing a functional group, such as aroyl, carbalkoxy, cyano and carboxamido, in the 2-position. The compounds are prepared by alkylation of a 2-aminobenzophenone followed by cyclization to the 2-substituted-3-arylindoles.

The compounds within the purview of the present invention are exemplified by the 2-substituted-3-arylindoles having the following formula:

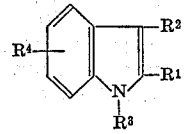
(I)

where
$R^1$ is selected from the group consisting of carbalkoxy, cyano, carbamoyl, benzoyl, nitrobenzoyl, halobenzoyl, lower alkylbenzoyl and lower alkoxybenzoyl;
$R^2$ is selected from the group consisting of phenyl, halophenyl, nitrophenyl, lower alkylphenyl and lower alkoxyphenyl;
$R^3$ is selected from the group consisting of hydrogen and lower alkyl;
$R^4$ is selected from the group consisting of halogen, lower alkyl, lower alkoxy, nitro, trifluoromethyl; and With the proviso that when $R^2$ is nitrophenyl and $R^4$ is nitro then $R^1$ is not carbalkoxy, cyano or carbamoyl. The proviso is added because nitro groups which function well in acid catalyzed cyclization may make base catalyzed cyclization difficult. Acid and base catalyzed cyclization are further described below.

As defined herein, the terms "lower alkyl," "lower alkoxy," and the like describe groups having from 1 to 4 carbon atoms.

Also within the purview of the present invention are the 2-(substituted)amino-5-halobenzophenones exemplified by the following formula which, as explained below, are intermediates in the preparation of compounds having Formula I:

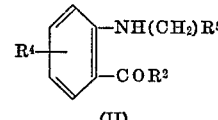
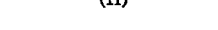
(II)

where
$R^5$ is selected from the group consisting of cyano, benzoyl and halobenzoyl.

A typical example of the compounds of this invention which are depicted by structural Formula I is 2-(p-chlorophenyl) 5-chloro-3-phenylindol-2-yl ketone.

A typical example of the compounds of this invention which are depicted by structural Formula II is 5-chloro-2-(p-chlorophenacylamino)benzophenone.

A new and useful compound of this invention may be prepared by the process which is hereinafter schematically illustrated:

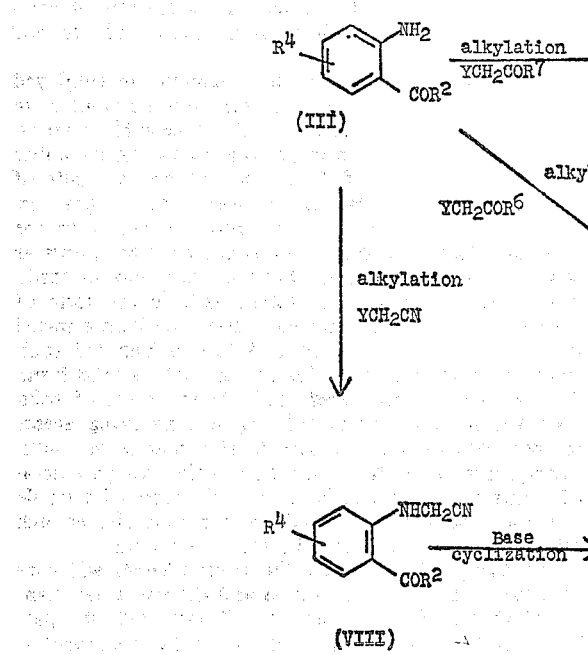

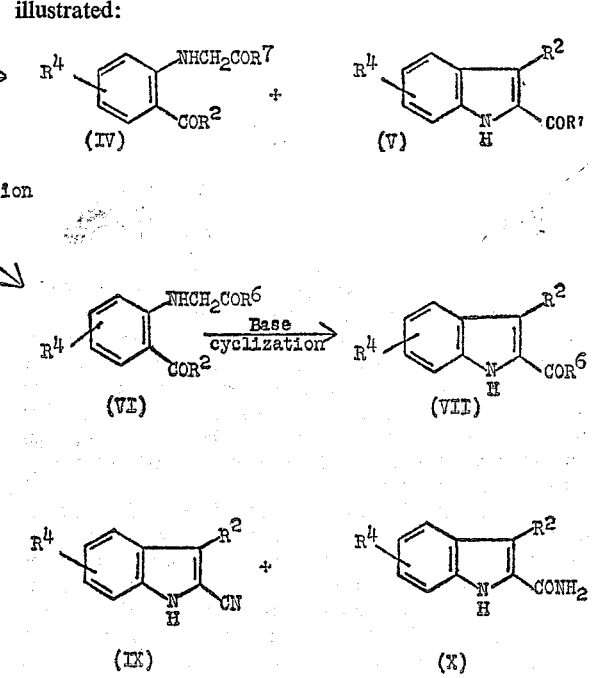

where $R^1$–$R^4$ are as defined above, and
$R^6$ is lower alkoxy,
$R^7$ is phenyl or halophenyl, nitrophenyl, lower alkylphenyl, and lower alkoxyphenyl; and
Y is chlorine, bromine, iodine, or p-toluene-sulfonate.

The starting materials used in the preparation of the claimed compounds are generally known or can be prepared by well-known procedures, for instance, the procedure of Example I below.

The aryl 3-phenylindol-2-yl ketones (V) of the present invention may be prepared in a one step reaction producing a mixture of the product with 2-phenacylaminobenzophenone (IV). The product (V) is produced by an acid catalyzed cyclization. A 2-aminobenzophenone (III) and a phenacylhalide in an aprotic solvent, such as N,N-dimethylformamide, dimethylsulfoxide or sulfolane, are mixed together and heated for 1½ to 3 hours at a temperature of about 80 to 100 degrees C. Preferably, the mixture is heated for about 1½ hours on a steam bath. The product of the reaction is cooled and diluted with an equal volume of water. When the reaction is complete, the mixture of products is separated by standard recovery methods. For instance, recrystallization from a solvent, such as acetonitrile, and filtration produces a solid product aryl 3-phenyl-indol-2-yl ketone (V) and concentration of the filtrate affords the 2-phenacylaminobenzophenone (IV).

The alkyl-3-phenylindol-2-yl-2-carboxylate (VII) may be prepared in a two step process. In the first step, a 2-aminobenzophenone (III) is dissolved in an aprotic solvent, such as dimethylformamide, dimethylsulfoxide or sulfolane, and an α-halo acetate ester is added to the solution. The solution is quickly heated to a temperature of about 100 to 160 degrees C. and maintained at that temperature for about 3 to 8 hours. Preferably, the solution is heated to reflux temperature and maintained at that temperature for about five hours. When the reaction is complete, the intermediate product, an N-(2-benzoyl)-phenylglycinate ester (IV) is separated by standard recovery methods. For instance, the intermediate product may be removed by cooling and filtration, and purified by washing with water, drying and recrystallizing from an alkanol or a succession of alkanols.

In the second step, which is a base catalyzed cyclization, the reaction product of the first step is added to a basic condensing agent, such as sodium or potassium alkoxide (methoxide, ethoxide, t-butoxide) in an alkanol (such as methanol, ethanol, t-butanol) or sodium or potassium hydride and the like, in an inert organic solvent, such as benzene, toluene, tetrahydrofuran and the like. While catalysts containing other metals may be used, as is known in the art, sodium and potassium are preferred because they will dissolve in the solvents used in the reaction, and because they produce strong bases. The suspension is stirred at a temperature of about 10 to 50 degrees C. for about 1 to 10 hours and allowed to stand. Preferably, the suspension is stirred at about 25° C. for about six hours and allowed to stand overnight.

When the reaction is complete the product a 3-phenyl-indol-2-yl-2-carboxylic acid ester (VII) is separated by standard recovery methods. For instance, the suspension may be cooled and the product filtered off, washed with water and dried. The solid material may be dissolved in hot benzene, toluene, benzenecyclohexane or aqueous ethanol filtered and the filtrate concentrated and cooled affording the product.

The products 2-cyano-3-phenylindoles (IX) and 2-carbamoyl-3-phenylindoles (X) may be produced in a two step process. In the first step, a 2-aminobenzophenone (III) and a haloacetonitrile in an aprotic solvent, such as dimethylformamide, dimethylsulfoxide or sulfolane, are heated at about 125 to 160 degrees C. for about 10 to 24 hours. Preferably, dimethylformamide is used and the reaction mixture is heated at reflux temperature for about 16 hours. When the reaction is complete, the product N-(2-benzoyl)phenylglycinonitrile (VIII) is separated by standard recovery methods. For instance, the solution is cooled and stirred and the solid separated by filtration, washed with water and dried. The product may be recrystallized from a succession of alkanols to afford the pure product N-(2-benzoyl) phenylglycinonitrile (VIII).

In the second step, which is a base catalyzed cyclization, the reaction product of the first step is added to a basic condensing agent, such as sodium or potassium alkoxide (methoxide, ethoxide, t-butoxide) in an alkanol (such as methanol, ethanol, t-butanol) or sodium or potassium hydride, and the like, in an inert organic solvent, such as benzene, toluene, tetrahydrofuran and the like. While other metals may be used, as is known in the art, sodium and potassium are preferred because they will dissolve in the solvents, preferably ethanol, used in the reaction, and because they produce strong bases. The reaction mixture is stirred and warmed to about 15 to 50 degrees C. for about 1 to 10 hours, preferably two hours.

When the reaction is complete, the solvent is removed under reduced pressure, the residue is triturated with water, and the product is filtered and dried. The reaction product contains a mixture of 2-cyano-3-phenylindoles (IX) and 2-carbamoyl-3-phenylindoles (X). The two products are separated by well-known means. For instance, the mixture may be dissolved in benzene, filtered clear, treated with activated carbon, heated and refiltered. The solid that forms on cooling is filtered, washed with benzene and dried to produce the product 2-carbamoyl-3-phenylindoles (X). The nitrile product 2-cyano-3-phenylindoles (IX) may be recovered by concentration of the filtrate.

In the pharmacological evaluation of the biological activity of the compounds of this invention, the in vivo effects are tested as follows. The compound is administered orally or intraperitoneally to three mice (14 to 24 grams) at each of the following doses; 400, 127, 40 and 12.7 milligrams per kilogram of host body weight (MPK). The animals are watched for a minimum of two hours during which time signs of general stimulation (i.e., increased spontaneous motor activity, hyperactivity on tactile stimulation, twitching), general depression (i.e., decreased spontaneous motor activity, decreased respiration), autonomic activity (i.e., miosis, hydriasis, diarrhea) are noted.

The compounds of this invention induce central nervous system depressant effects at a dose of 127 to 400 MPK.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, i.e., intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples all temperatures are stated in degrees centigrade, and the following abbreviations are used: "g." for grams, "ml." for milliliters, and "mole" for gram molecular weight.

EXAMPLE I

The following example illustrates the preparation of ethyl 2-benzoyl-4-chlorophenylglycinate, a known compound of Formula VI.

To a solution of 2-amino-5-chlorobenzophenone (49 g., 0.21 mole) in 175 ml. of N,N-dimethylformamide, was added 28 ml. (42 g., 0.25 mole) of ethyl α-bromacetate. The solution was brought to reflux quickly and heating continued for 5 hours. After cooling, the mixture was poured onto ice (600 g.). On standing the product crystallized and was filtered off, washed with water, and dried on the funnel. After two recrystallizations (ethanol-water [80%], methanol), the product (30 g., 48 percent of theoretical yield) was found to have a melting point of 104–105° C.

Based on the assumed molecular formula $C_{17}H_{16}NO_3Cl$, it was calculated that the elemental analysis by weight would be 64.35 percent carbon, 5.08 percent hydrogen and 4.41 percent nitrogen. The product was analyzed and found to contain 64.30 percent carbon, 5.16 percent hydrogen, and 4.53 percent nitrogen which confirmed the accuracy of the assumed formula. This may be expressed:

*Analysis.*—Calcd. for $C_{17}H_{16}NO_3Cl$ (percent): C, 64.35; H, 5.08; N, 4.41. Found (percent): C, 64.30; H, 5.16; N, 4.53.

Following the procedure of Example I but substituting appropriate starting materials, products having the following substituents may be prepared:

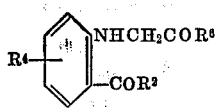

| Example: | R² | R⁶ | R⁴ |
|---|---|---|---|
| I | $C_6H_5$— | $C_2H_5O$— | H |
| I-1 | $C_6H_5$— | $CH_3O$— | Cl |
| I-2 | $C_6H_5$— | $C_3H_7O$— | $CH_3$ |
| I-3 | $C_6H_5$— | $C_4H_9O$— | $NO_2$ |
| I-4 | p-$ClC_6H_4$— | $CH_3O$— | $CF_3$ |
| I-5 | m-$ClC_6H_4$— | $C_2H_5O$— | Br |
| I-6 | o-$Cl$—$C_6H_4$ | $C_3H_7O$— | $C_2H_5$ |
| I-7 | m-$FC_6H_4$— | $C_4H_9O$— | I |
| I-8 | p-$FC_6H_4$— | $CH_3O$— | $C_3H_7$ |
| I-9 | p-$BrC_6H_4$— | $C_2H_5O$— | F |
| I-10 | p-$IC_6H_4$— | $C_2H_5O$— | $C_4H_9$ |
| I-11 | p-$NO_2C_6H_4$— | $CH_3O$— | $CH_3O$— |
| I-12 | m-$NO_2C_6H_4$— | $CH_3O$— | $C_2H_5O$— |
| I-13 | o-$NO_2C_6H_4$— | $CH_3O$— | $NO_2$ |
| I-14 | p-$CH_3C_6H_4$ | $C_2H_5O$— | $C_4H_9O$— |
| I-15 | m-$C_2H_5C_6H_4$— | $CH_3O$— | $CF_3$ |
| I-16 | p-$C_4H_9C_6H_4$— | $CH_3O$— | $CH_3$ |
| I-17 | p-$CH_3OC_6H_4$— | $C_4H_9O$— | $C_2H_5$— |
| I-18 | m-$C_2H_5OC_6H_4$— | $CH_3O$— | Cl |
| I-19 | p-$C_3H_7OC_6H_4$— | $CH_3O$— | $NO_2$ |
| I-20 | p-$C_4H_9OC_6H_4$— | $CH_3O$— | $C_3H_7O$— |

EXAMPLE II

The following example illustrates the preparation of N-(2-benzoyl-4-chloro)phenylglycinonitrile, a compound of Formula VIII.

A solution of 2-amino-5-chlorobenzophenone (19.6 g., 0.085 mole) and chloroacetonitrile (8 g., 0.107 mole) in 100 ml. of N,N-dimethylformamide was heated under reflux conditions for 16 hours. The solution was cooled and poured into 400 ml. of ice-water and stirred. This was filtered off, and washed with water, and dried. The product was crystallized from ethanol to afford a crude product having a melting point of 174–176°, and recrystallized from isopropyl alcohol to afford 4.2 g. of a product having a melting point of 177–178°.

*Analysis.*—Calcd. for $C_{15}H_{11}N_2OCl$ (percent): C, 66.55; H, 4.09; N, 10.35; Cl, 13.10. Found (percent): C, 66.34; H, 4.36; N, 10.65; Cl, 13.33.

Following the procedure of Example II but substituting appropriate starting materials, products having the following substituents may be prepared:

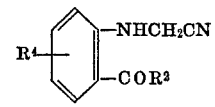

| Example: | R² | R⁴ |
|---|---|---|
| II | $C_6H_5$— | H |
| II-1 | $C_6H_5$— | Cl |
| II-2 | $C_6H_5$— | $CH_3$ |
| II-3 | $C_6H_5$— | $NO_2$ |
| II-4 | p-$ClC_6H_4$— | $CF_3$ |
| II-5 | m-$ClC_6H_4$— | Br |
| II-6 | o-$Cl$—$C_6H_4$ | $C_2H_5$ |
| II-7 | m-$FC_6H_4$— | I |
| II-8 | p-$FC_6H_4$— | $C_3H_7$ |
| II-9 | p-$BrC_6H_4$— | F |
| II-10 | p-$IC_6H_4$— | $C_4H_9$ |
| II-11 | p-$NO_2C_6H_4$— | $CH_3O$— |
| II-12 | m-$NO_2C_6H_4$— | $C_2H_5O$— |
| II-13 | o-$NO_2C_6H_4$— | $NO_2$ |
| II-14 | p-$CH_3C_6H_4$— | $C_4H_9O$— |
| II-15 | m-$C_2H_5C_6H_4$— | $CF_3$ |
| II-16 | p-$C_4H_9C_6H_4$— | $CH_3$ |
| II-17 | p-$CH_3OC_6H_4$— | $C_2H_5$ |
| II-18 | m-$C_2H_5OC_6H_4$— | Cl |
| II-19 | p-$C_3H_7OC_6H_4$— | $NO_2$ |
| II-20 | p-$C_4H_9OC_6H_4$— | $C_3H_7O$— |

EXAMPLE III

The following illustrates the preparation of ethyl 5-chloro-3-phenylindole-2-carboxylate, a compound of Formula VII.

To a freshly prepared solution of sodium ethoxide (from 6.44 g., 0.28 mole of sodium in 600 ml. of anhydrous ethanol), cooled to 10° and well stirred, was added solid, finely divided ethyl N-(2-benzoyl-4-chloro)phenyl glycinate (89 g., 0.38 mole). The suspension was stirred at 25° C. for 6 hours and allowed to stand overnight. The suspension was cooled to 10° C. and cold water (800 ml.) was added. The product was filtered off, washed several times with water and dried. This material was dissolved in 800 ml. of hot benzene, filtered, concentrated to 400 ml., and cooled. The product weighed 29 g., a 34.5 percent of theoretical yield, and had a melting point of 171–172°.

*Analysis.*—Calcd. for $C_{17}H_{14}NClO_2$ (percent): C, 68.40; H, 4.71; N, 4.70; Cl, 11.79. Found (percent): C, 68.52; H, 4.58; N, 4.64; Cl, 12.07.

Following the procedure of Example III but substituting appropriate starting materials, products having the following substituents may be prepared:

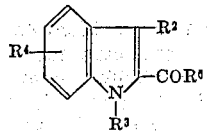

| Example: | R² | R³ | R⁶ | R⁴ |
|---|---|---|---|---|
| III | C₆H₅— | H | C₂H₅O— | H |
| III-1 | C₆H₅— | H | CH₃O— | Cl |
| III-2 | C₆H₅— | H | C₃H₇O— | CH₃ |
| III-3 | C₆H₅— | H | C₄H₉O— | C₂H₅ |
| III-4 | p-ClC₆H₄— | H | CH₃O— | CF₃ |
| III-5 | m-ClC₆H₄— | H | C₂H₅O— | Br |
| III-6 | o-ClC₆H₄— | H | C₃H₇O— | C₂H₅ |
| III-7 | m-FC₆H₄— | H | C₄H₉O— | I |
| III-8 | p-FC₆H₄— | H | CH₃O— | C₃H₇ |
| III-9 | p-BrC₆H₄— | H | C₂H₅O— | F |
| III-10 | p-IC₆H₄— | H | C₂H₅O— | C₄H₉ |
| III-11 | p-ClC₆H₄— | H | CH₃O— | CH₃O— |
| III-12 | m-ClC₆H₄— | H | CH₃O— | C₂H₅O— |
| III-13 | o-ClC₆H₄— | H | CH₃O— | C₃H₇O— |
| III-14 | p-CH₃C₆H₄— | H | C₂H₅O— | C₄H₉O— |
| III-15 | m-C₂H₅C₆H₄— | H | CH₃O— | CF₃ |
| III-16 | p-C₄H₉C₆H₄— | H | CH₃O— | CH₃ |
| III-17 | p-CH₃OC₆H₄— | H | C₄H₉O— | C₂H₅ |
| III-18 | m-C₂H₅OC₆H₄— | H | CH₃O— | Cl |
| III-19 | p-C₃H₇OC₆H₄— | H | CH₃O— | CH₃O |
| III-20 | p-C₄H₉OC₆H₄— | H | CH₃O— | C₃H₇O— |

EXAMPLE IV

The following example illustrates the preparation of 3-phenyl-5-chloroindole-2-carboxamide, a compound of Formula X.

To a warm stirred suspension of N-(2-benzoyl-4-chloro) phenylglycinonitrile (3.5 g., 0.013 mole) in 100 ml. of absolute ethanol was added a fresh solution of sodium ethoxide (0.345 g. sodium in 30 ml. of absolute ethanol). This was stirred and warmed (25–50°) during 2 hours. The solution was cooled and the solvent removed under reduced pressure. The residue was triturated with water, and the product was filtered and dried. The product (3.3 g.) had a melting point of 226–228°. Infrared spectral analysis indicated both 2-nitrile and 2-carboxamide groups were present. The mixture was dissolved in 75 ml. of benzene. This was filtered clear, treated with activated carbon and refiltered (hot). On cooling, a solid formed. The product was filtered, washed with benzene, and dried, and found to have a melting point of 268–270°.

Following the procedure of Example IV but substituting appropriate starting materials, products having the following substituents may be prepared:

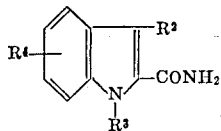

| Example: | R² | R³ | R⁴ |
|---|---|---|---|
| IV | C₆H₅— | H | H |
| IV-1 | C₆H₅— | H | Cl |
| IV-2 | C₆H₅— | H | CH₃ |
| IV-3 | C₆H₅— | H | C₂H₅ |
| IV-4 | p-ClC₆H₄— | H | CF₃ |
| IV-5 | m-ClC₆H₄— | H | Br |
| IV-6 | o-ClC₆H₄— | H | C₂H₅ |
| IV-7 | m-FC₆H₄— | H | I |
| IV-8 | p-FC₆H₄— | H | C₃H₇ |
| IV-9 | p-BrC₆H₄— | H | F |
| IV-10 | p-IC₆H₄— | H | C₄H₉ |
| IV-11 | p-Cl₂C₆H₄— | H | CH₃O— |
| IV-12 | m-Cl₂C₆H₄— | H | C₂H₅P— |
| IV-13 | o-Cl₂C₆H₄— | H | C₃H₇O— |
| IV-14 | p-CH₃C₆H₄— | H | C₄H₉O— |
| IV-15 | m-C₂H₅C₆H₄— | H | CF₃ |
| IV-16 | p-C₄H₉C₆H₄ | H | CH₃ |
| IV-17 | p-DH₃OC₆H₄— | H | C₂H₅ |
| IV-18 | m-C₂H₅OC₆H₄— | H | Cl |
| IV-19 | p-C₃H₇OC₆H₄— | H | CH₃O— |
| IV-20 | p-C₄H₉OC₆H₄— | H | C₃H₇O— |

EXAMPLE V

The following example illustrates the preparation of 5-chloro-2-(p-chlorophenacylamino)benzophenone, a compound of Formula IV, and p-chlorophenyl 5-chloro-3-phenylindol-2-yl ketone, a compound of Formula V.

Part A.—A mixture of 4.6 g. of 2-amino-5-chlorobenzophenone, 4.6 g. of p-chlorophenacylbromide and 25 ml. of dimethylformamide was heated for 1½ hours on a steam bath. The resultant red solution was cooled and diluted with an equal volume of water yielding a sticky solid. Recrystallization from acetonitrile gave 3.8 g. of solid, p-chlorophenyl 5-chloro-3-phenylindol-2-yl ketone having a melting point of 198–200°.

*Analysis.*—Calcd. for C₂₁H₁₃Cl₂NO (percent): C, 68.87; H, 3.57; N, 3.83; Cl, 19.36. Found (percent): C, 68.39; H, 3.62; N, 3.94; Cl, 19.33.

The product was analyzed in the foregoing pharmacological procedure and found to induce decreased motor activity and decreased respiration at a dose of 400 MPK administered either orally or parenterally.

Part B.—Concentration of the above acetonitrile filtrate gave 0.5 g. of 5-chloro-2-(p-chlorophenacylamino)-benzophenone having a melting point of 144–146° which was unchanged on recrystallization from ethanol.

*Analysis.*—Calcd. for C₂₁H₁₅Cl₂NO₂ (percent): C, 65.64; H, 3.93; N, 3.65; Cl, 18.45. Found (percent): C, 65.47; H, 4.01; N, 3.61; Cl, 18.38.

The product was analyzed in the foregoing pharmacological procedure and found to induce decreased motor activity and decreased respiration at a dose of 127 MPK administered parenterally.

Following the procedure of Example V, Part A, but substituting appropriate starting materials, products having the following substituents may be prepared:

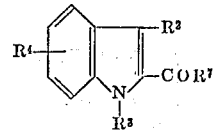

| Example: | R² | R³ | R⁴ | R⁷ |
|---|---|---|---|---|
| VA | C₆H₅— | H | H | p-ClC₆H₄— |
| VA-1 | C₆H₅— | H | Cl | p-ClC₆H₄— |
| VA-2 | C₆H₅— | H | CH₃ | p-ClC₆H₄— |
| VA-3 | C₆H₅— | H | NO₂ | p-ClC₆H₄— |
| VA-4 | p-ClC₆H₄— | H | CF₃ | m-BrC₆H₄— |
| VA-5 | m-ClC₆H₄— | H | Br | p-BrC₆H₄— |
| VA-6 | o-ClC₆H₄— | H | C₂H₅ | o-BrC₆H₄— |
| VA-7 | m-FC₆H₄— | H | I | p-FC₆H₄— |
| VA-8 | p-FC₆H₄— | H | C₃H₇ | p-IC₆H₄— |
| VA-9 | p-BrC₆H₄— | H | F | o-BrC₆H₄— |
| VA-10 | p-IC₆H₄— | H | C₄H₉ | m-IC₆H₄— |
| VA-11 | p-NO₂C₆H₄— | H | CH₃O— | p-NO₂C₆H₄— |
| VA-12 | m-NO₂C₆H₄— | H | C₂H₅O— | m-NO₂C₆H₄— |
| VA-13 | o-NO₂C₆H₄— | H | NO₂ | o-NO₂C₆H₄— |
| VA-14 | p-CH₃C₆H₄— | H | C₄H₉O— | p-CH₃C₆H₄— |
| VA-15 | m-C₂H₅C₆H₄— | H | CF₃ | m-C₂H₅C₆H₄— |
| VA-16 | p-C₄H₉C₆H₄— | H | CH₃ | p-C₄H₉C₆H₄— |
| VA-17 | p-CH₃OC₆H₄— | H | C₂H₅ | p-CH₃OC₆H₄— |
| VA-18 | m-C₂H₅OC₆H₄— | H | Cl | m-C₂H₅OC₆H₄— |
| VA-19 | p-C₃H₇OC₆H₄— | H | NO₂ | p-C₄H₉C₆H₄— |
| VA-20 | p-C₄H₉OC₆H₄— | H | C₃H₇O— | m-CH₃C₆H₄— |

Following the procedure of Example V, Part B, but substituting appropriate starting materials, products having the following substituents may be prepared:

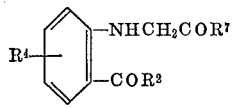

| | $R^2$ | $R^4$ | $R^7$ |
|---|---|---|---|
| Example: | | | |
| VB | $C_6H_5-$ | H | $p\text{-}ClC_6H_4-$ |
| VB-1 | $C_6H_5-$ | Cl | $p\text{-}ClC_6H_4-$ |
| VB-2 | $C_6H_5-$ | $CH_3$ | $p\text{-}ClC_6H_4-$ |
| VB-3 | $C_6H_5-$ | $NO_2$ | $p\text{-}ClC_6H_4-$ |
| VB-4 | $p\text{-}ClC_6H_4-$ | $CF_3$ | $m\text{-}BrC_6H_4-$ |
| VB-5 | $m\text{-}ClC_6H_4-$ | Br | $p\text{-}BrC_6H_4-$ |
| VB-6 | $o\text{-}ClC_6H_4-$ | $C_2H_5$ | $o\text{-}BrC_6H_4-$ |
| VB-7 | $m\text{-}FC_6H_4-$ | I | $p\text{-}FC_6H_4-$ |
| VB-8 | $p\text{-}FC_6H_4-$ | $C_3H_7$ | $p\text{-}IC_6H_4-$ |
| VB-9 | $p\text{-}BrC_6H_4-$ | F | $o\text{-}BrC_6H_4-$ |
| VB-10 | $p\text{-}IC_6H_4-$ | $C_4H_9$ | $m\text{-}IC_6H_4-$ |
| VB-11 | $p\text{-}NO_2C_6H_4-$ | $CH_3O-$ | $p\text{-}NO_2C_6H_4-$ |
| VB-12 | $m\text{-}NO_2C_6H_4-$ | $C_2H_5O-$ | $m\text{-}NO_2C_6H_4-$ |
| VB-13 | $o\text{-}NO_2C_6H_4-$ | $NO_2$ | $o\text{-}NO_2C_6H_4-$ |
| VB-14 | $p\text{-}CH_3C_6H_4-$ | $C_4H_9O-$ | $p\text{-}CH_3C_6H_4-$ |
| VB-15 | $m\text{-}C_2H_5C_6H_4-$ | $CF_3$ | $m\text{-}C_2H_5C_6H_4-$ |
| VB-16 | $p\text{-}C_4H_9C_6H_4-$ | $CH_3$ | $p\text{-}C_4H_9C_6H_4-$ |
| VB-17 | $p\text{-}CH_3OC_6H_4-$ | $C_2H_5$ | $p\text{-}CH_3OC_6H_4-$ |
| VB-18 | $m\text{-}C_2H_5OC_6H_4-$ | Cl | $m\text{-}C_2H_5OC_6H_4-$ |
| VB-19 | $p\text{-}C_3H_7OC_6H_4-$ | $NO_2$ | $p\text{-}C_4H_9C_6H_4-$ |
| VB-20 | $p\text{-}C_4H_9OC_6H_4-$ | $C_3H_7O-$ | $m\text{-}CH_3C_6H_4-$ |

EXAMPLE VI

The following example illustrates the preparation of 5-chloro-3-phenylindol-2-yl p-nitrophenyl ketone, a compound of Formula V.

A solution of 0.93 g. (0.03 mole) of 2-amino-5-chlorobenzophenone and 7.32 g. (0.03 mole) of p-nitrophenacyl bromide in 25 ml. of N,N-dimethylformamide was heated on a steam bath for 3 hours. N,N-dimethylformamide was removed at reduced pressure and the residue dissolved in dimethoxyethane. Some solid (dimethylamine hydrobromide) was collected. The filtrate was concentrated and the residue dissolved in benzene. The benzene solution was first washed with water and then dried over anhydrous magnesium sulfate. After removal of benzene there was obtained 2.0 g. of crude product. This was recrystallized from benzene to afford a product having a melting point of 222–224°.

*Analysis.*—Calcd. for $C_{21}H_{13}ClN_2O_3$ (percent): C, 66.94; H, 3.48; N, 7.44. Found (percent): C, 67.20; H, 3.49; N, 7.29.

The product was evaluated in the above pharmacological procedure and found to induce decreased motor activity and decreased respiration at a dose of 400 MPK administered parenterally.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from those having the formula:

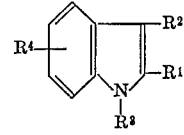

where $R^1$ is selected from the group consisting of benzoyl, nitrobenzoyl, halobenzoyl, lower alkylbenzoyl and lower alkoxybenzoyl;

$R^2$ is selected from the group consisting of phenyl halophenyl, nitrophenyl, lower alkylphenyl and lower alkoxyphenyl;

$R^3$ is selected from the group consisting of hydrogen, and lower alkyl;

$R^4$ is selected from the group consisting of halogen, lower alkyl, lower alkoxy, nitro, trifluoromethyl.

2. A compound as defined in claim 1 which is: 2-(p-chlorophenyl) 5-chloro-3-phenylindol-2-yl ketone.

3. A compound as defined in claim 1 which is: 5-chloro-3-phenylindol-2-yl p-nitrophenyl ketone.

4. A process for preparing a compound selected from those having the formula:

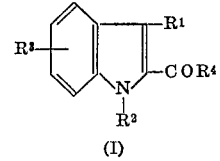

where $R^1$ is selected from the group consisting of phenyl, halophenyl, nitrophenyl, lower alkylphenyl and lower alkoxyphenyl;

$R^2$ is selected from the group consisting of hydrogen and lower alkyl;

$R^3$ is selected from the group consisting of halogen, lower alkyl, lower alkoxy, nitro, trifluoromethyl; and $R^4$ is phenyl, halophenyl, nitrophenyl, lower alkylphenyl or lower alkoxyphenyl;

comprising heating together a 2-aminobenzophenone and a phenacyl halide in an aprotic solvent for about 1½ to 3 hours at a temperature of about 80 to 100° C.

References Cited

Chem. Abs., abs. of Belgian Pat. 637,355, Mar. 13, 1964, abs. date (1965), 62:7731.

ALEX MAZEL, Primary Examiner

J. A. NARCAVAGE, Assistant Examiner

U.S. Cl. X.R.

260—319.1, 326.13 R, 465 E, 471 R, 570 R; 424—274